(12) United States Patent        (10) Patent No.:     US 8,462,010 B2
Chi et al.                        (45) Date of Patent:      Jun. 11, 2013

(54) METHODS AND DEVICES FOR AUGMENTING A FIELD OF VIEW

(75) Inventors: Liang-Yu (Tom) Chi, San Francisco, CA (US); Robert Allen Ryskamp, Zurich (CH); Luis Ricardo Prada Gomez, Hayward, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/461,492

(22) Filed: May 1, 2012

(65) Prior Publication Data

US 2012/0235827 A1    Sep. 20, 2012

Related U.S. Application Data

(63) Continuation of application No. 13/046,978, filed on Mar. 14, 2011, now Pat. No. 8,188,880.

(51) Int. Cl.
*G08B 5/22*     (2006.01)
*G09F 9/33*     (2006.01)
*G09G 5/00*     (2006.01)
*G09G 1/095*    (2006.01)
*G06K 9/00*     (2006.01)
*G02B 26/08*    (2006.01)
*G02B 23/24*    (2006.01)
*G02B 3/00*     (2006.01)
*G03B 21/56*    (2006.01)

(52) U.S. Cl.
USPC .......... 340/815.45; 340/944; 345/7; 382/103; 359/196.1; 359/362; 359/443; 359/642; 362/800

(58) Field of Classification Search
USPC .............. 340/815.45, 815.4, 815, 944; 345/7; 382/103; 359/196.1, 237, 362, 443, 462; 362/800
See application file for complete search history.

(56) References Cited

U.S. PATENT DOCUMENTS

| 4,822,160 A | 4/1989 | Tsai |
| 4,904,078 A | 2/1990 | Gorike |
| 5,742,263 A | 4/1998 | Wang et al. |
| 5,764,785 A | 6/1998 | Jones et al. |

(Continued)

OTHER PUBLICATIONS

Nelson et al., "Tracking Objects Using Recognition," The University of Rochester, Computer Science Department, Feb. 2002.

(Continued)

*Primary Examiner* — Daniel Wu
*Assistant Examiner* — Emily C Terrell
(74) *Attorney, Agent, or Firm* — McDonnell Boehnen Hulbert & Berghoff LLP

(57) ABSTRACT

The present application discloses methods and systems for augmenting a field of view of a user. In one embodiment, a device may include a detector, a processor, and an array of visual indicators. According to an embodiment of the method, the detector may image an environment. The processor may identify within the environment imaged by the detector an object of interest. The processor may also determine a relative spatial location of the identified object of interest. Further, the array of visual indicators may be used to indicate the determined relative spatial location of the identified object of interest. In particular, a set of one or more visual indicators may be selected that has a relative spatial location in the array of visual indicators that is indicative of the relative spatial location of the identified object of interest.

22 Claims, 8 Drawing Sheets

U.S. PATENT DOCUMENTS

| | | | |
|---|---|---|---|
| 5,815,411 | A | 9/1998 | Ellenby et al. |
| 6,244,703 | B1 | 6/2001 | Resnikoff et al. |
| 6,349,001 | B1 | 2/2002 | Spitzer |
| 6,369,952 | B1 | 4/2002 | Rallison et al. |
| 6,554,444 | B2 | 4/2003 | Shimada et al. |
| 6,735,328 | B1 | 5/2004 | Helbing et al. |
| 6,966,668 | B2 | 11/2005 | Cugini et al. |
| 6,967,569 | B2 | 11/2005 | Weber et al. |
| 7,126,558 | B1 | 10/2006 | Dempski |
| 7,162,054 | B2 | 1/2007 | Meisner et al. |
| 7,180,476 | B1 | 2/2007 | Guell et al. |
| 7,221,505 | B2 | 5/2007 | Goral |
| 7,486,291 | B2 | 2/2009 | Berson et al. |
| 7,645,041 | B2 | 1/2010 | Frare |
| 7,889,290 | B2 | 2/2011 | Mills |
| 8,159,337 | B2 * | 4/2012 | Silver et al. .............. 340/539.13 |
| 2002/0052684 | A1 | 5/2002 | Bide |
| 2003/0086054 | A1 | 5/2003 | Waters |
| 2004/0183749 | A1 | 9/2004 | Vertegaal |
| 2005/0086610 | A1 | 4/2005 | Mackinlay et al. |
| 2006/0007671 | A1 | 1/2006 | Lavoie |
| 2008/0089556 | A1 | 4/2008 | Salgian et al. |
| 2009/0231116 | A1 | 9/2009 | Takahashi et al. |
| 2010/0007582 | A1 | 1/2010 | Zalewski |
| 2010/0060552 | A1 | 3/2010 | Watanabe et al. |
| 2010/0226535 | A1 | 9/2010 | Kimchi et al. |
| 2010/0238161 | A1 * | 9/2010 | Varga et al. ................... 345/419 |
| 2011/0037606 | A1 | 2/2011 | Boise |
| 2011/0043680 | A1 | 2/2011 | Uehara |

OTHER PUBLICATIONS

Haase et al., "AR Binocular: Augmented Reality System for Nautical Navigation," Christian-Albrecht-University of Kiel, Germany, Computer Science Department, Feb. 18, 2011.

* cited by examiner

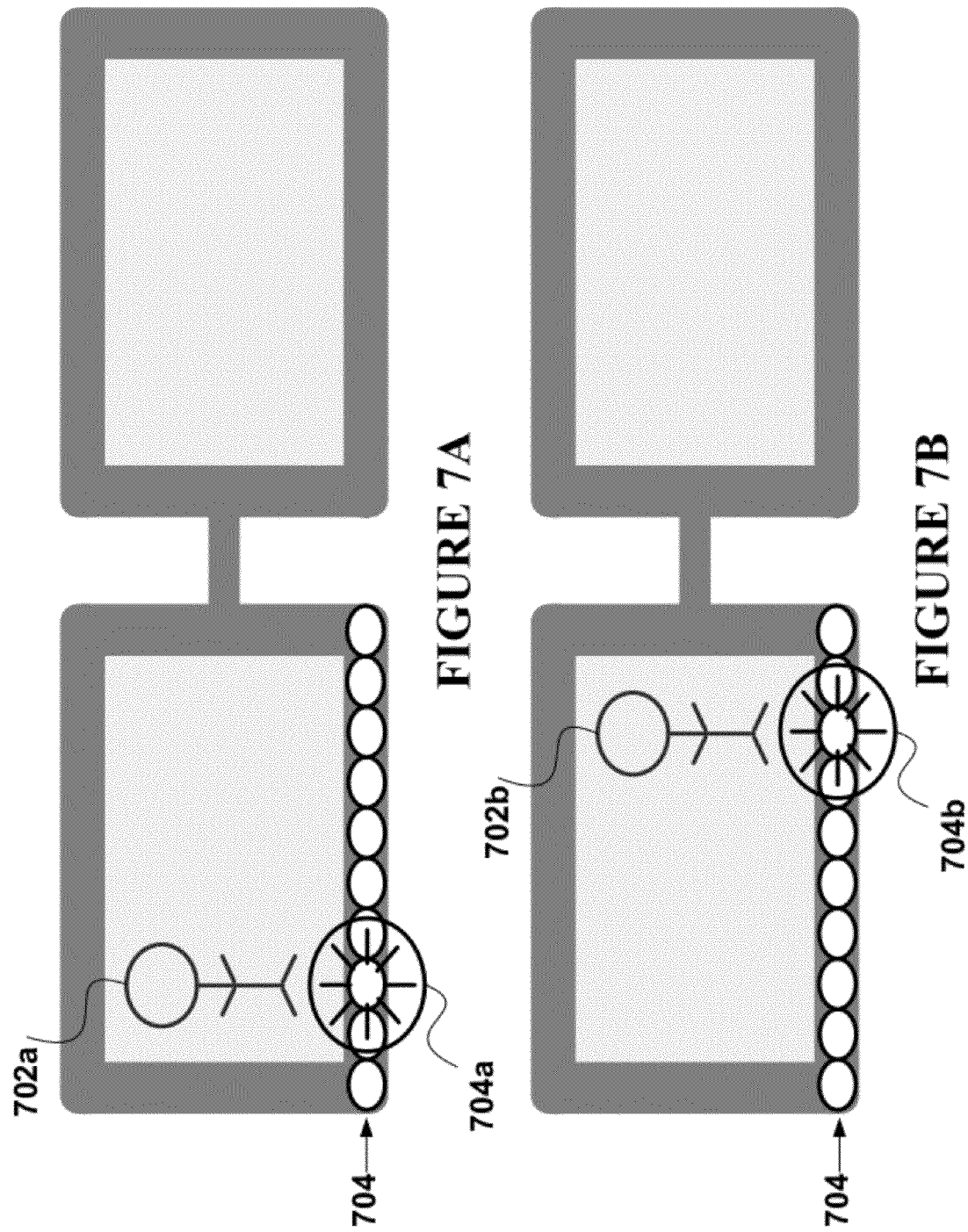

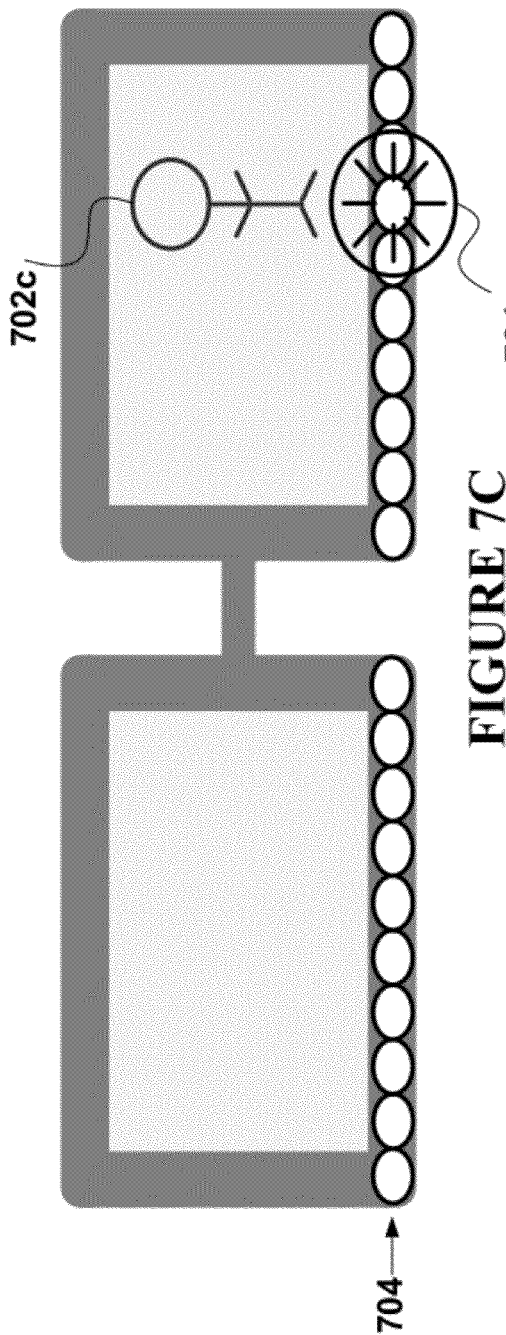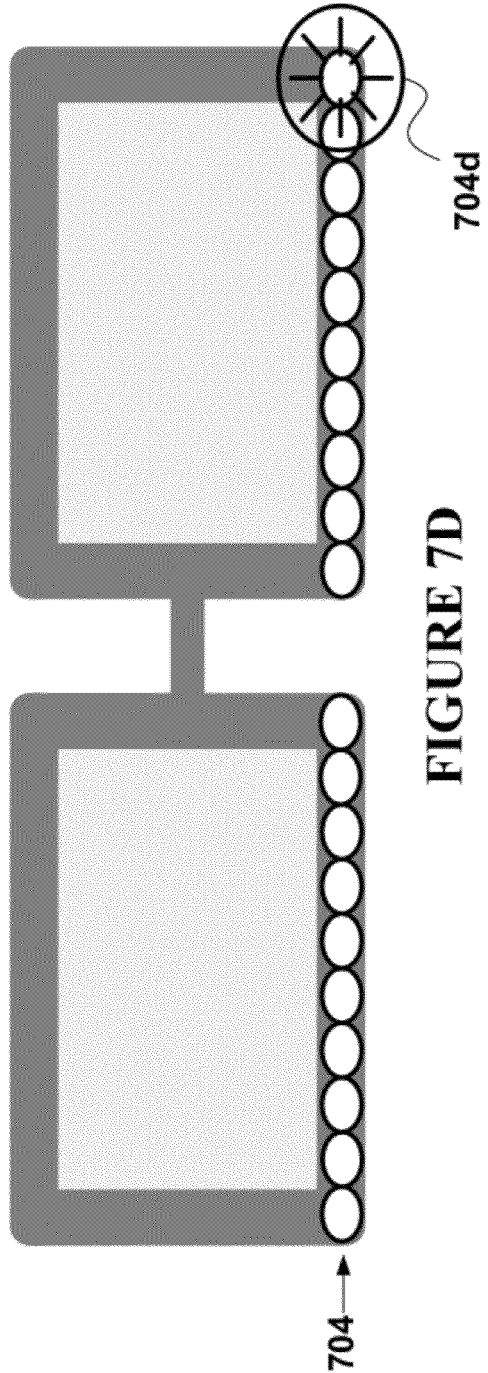

METHODS AND DEVICES FOR AUGMENTING A FIELD OF VIEW

CROSS-REFERENCE TO RELATED APPLICATION

This application is a continuation of U.S. patent application Ser. No. 13/046,978 filed Mar. 14, 2011, the contents of which are hereby incorporated by reference.

BACKGROUND

The extent of the observable world that is seen by a human at a given instant may be referred to as a field of view. The field of view of a human is somewhat limited, generally around 180°, and is further limited by the fact that the human brain does not always process all objects or all features of objects within the field of view. As an example, the brain of a user can typically only read and process text using a small cone in the retina called the fovea that has only about a 2° field of view. As another example, the ability of the human eye to detect colors typically does not span the full field of view of a human. As still another example, there is typically a "blind spot" (or unprocessed area) in the field of view of a human where the retina attaches to the optic nerve. For these and other reasons, a human may often not be aware of an object positioned nearby, either because the object falls outside of the human's field of view, or because the human's brain has not fully processed the object.

By not being aware of some surrounding objects, a human may miss opportunities to see interesting people, monuments, or other objects that may be of interest to the human. Therefore, it would be desirable to enable a human to become aware of objects around him or her that may be of interest. In particular, it would be desirable to enable the human to become aware of objects that are outside his or her field of view. Further, it would be desirable to enable the human to become aware of objects inside his or her field of view that are of particular interest to the human. Together, this may be referred to as "augmenting" a field of view of the human.

SUMMARY

Methods and devices for augmenting a field of view of a human are presently contemplated. In one embodiment, a device may be used to indicate surrounding objects that may be of interest to the human. The device may take the form of, for example, an eyewear device, such as a pair of glasses that may be worn by a user (e.g., the human). The device may be designed to include a detector, a processor, and one or more visual indicators, which may work together to identify objects of interest and indicate the objects of interest to the user.

As an example, the detector may be used to image an environment around the user. Within the environment imaged by the detector, the processor may detect and identify an object of interest. Once the object of interest is identified, one or more visual indicators may be used to indicate a relative spatial location of the identified object of interest. For example, one or more visual indicators may be illuminated or may change color. The one or more visual indicators, upon being illuminated or changing color, may serve to alert the user to the presence of the object of interest. In particular, the relative spatial location of the one or more visual indicators may indicate to the user the relative spatial location of the identified object of interest.

BRIEF DESCRIPTION OF THE DRAWINGS

FIGS. 7A-7D illustrate iterative indications of an object of interest during movement of one or both of a user and an object of interest.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Overview of a Device and System

As noted above, the field of view of a human is somewhat limited. Accordingly, in order to augment the field of view of the human, one possibility is to make use of an imaging device that is designed to be able to image objects in an environment surrounding the human.

One limitation of the field of view of the human is that the human brain does not always process all objects or all features of objects within the field of view. To counter this limitation, the detector may be able to image (or "see") objects that are located inside the field of view of the human, even when the objects are not processed by the human's brain.

Another limitation of the field of view of the human is that the field of view of the human is typically only about 180°, meaning some objects in an environment surrounding a human may not be within the field of view of the human. To counter this limitation (which may be done instead of or in addition to countering the limitation described above), the detector may be able to image objects that are located outside of the field of view of the human.

Figure 1:
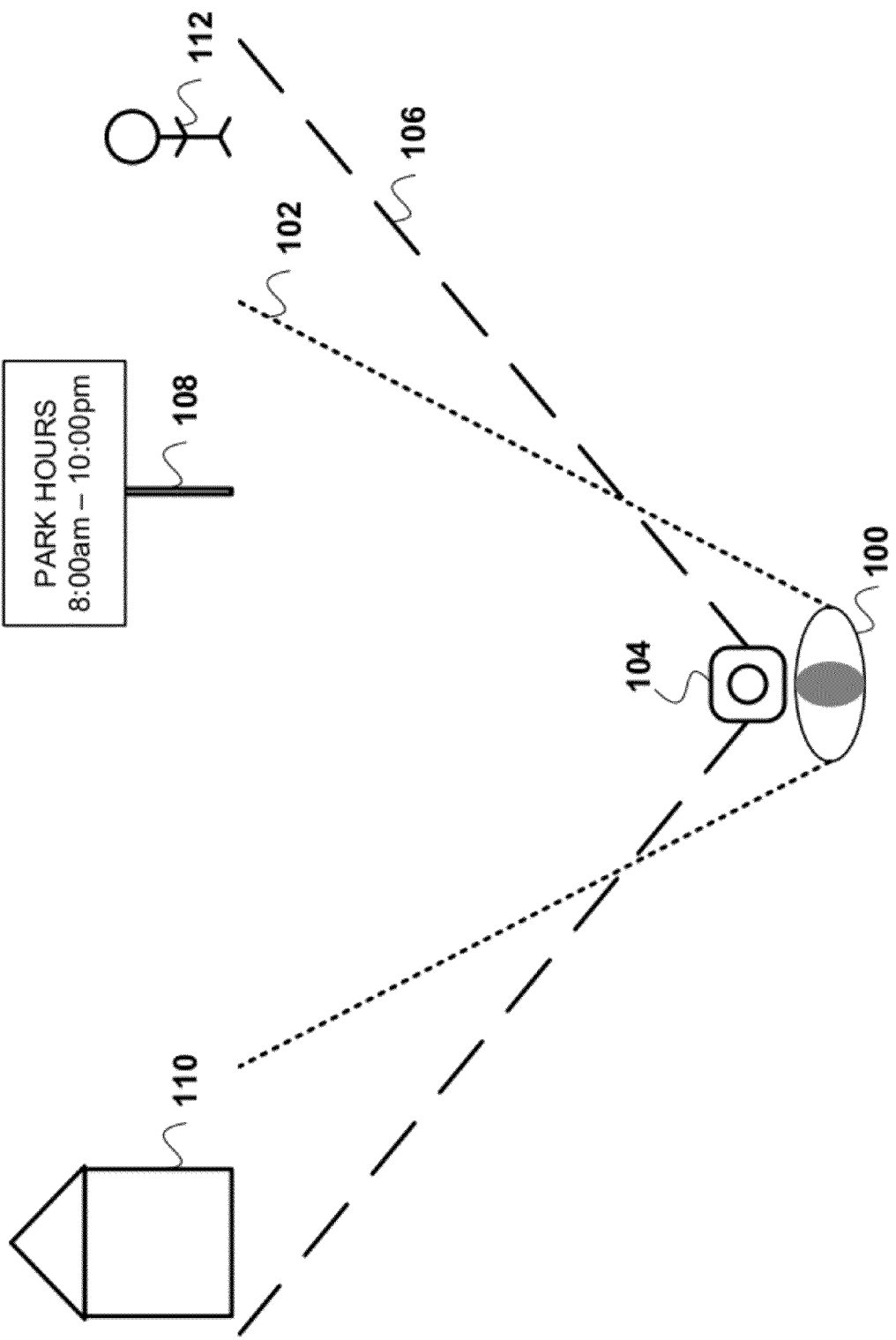
FIG. 1 illustrates the field of view of a user as compared to the field of view of an example detector.

FIG. 1 illustrates the field of view of a user as compared to the field of view of an example detector. As shown, a user 100 (as indicated by the image of the eye) has a field of view 102, and a detector 104 has a field of view 106. The respective fields of view 102 and 106 of the user 100 and the detector 104 may be compared by considering the objects that are located inside each field of view.

FIG. 1 shows three objects: a sign 108, a house 110, and a person 112. As shown, the field of view 102 of the user 100 includes only the sign 108, while the field of view 106 of the detector 104 includes the sign 108, the house 110, and the person 112. The detector 104 may be used to "augment" the field of view 102 of the user 100 by imaging the objects both inside and outside the field of view 102 of the user 100.

As a first example, while the sign 108 is shown to be inside the field of view 102 of the user 100, the sign 108 may be outside the portion of the field of view 102 in which the brain of the user 100 processes text, such that the user 100 is unable to read the text on the sign 108 without shifting his or her field of view 102. Like the field of view 102 of the user, the field of view 106 of the detector 104 also includes the sign 108. More precisely, the detector 104 may image the environment within its field of view 106, and the imaged environment may include the sign 108. However, unlike the user 100, the detector 104 is able to image (and thus process) objects located in substantially all of its field of view 106. Accordingly, the detector 104 is able to process (using, e.g., optical character recognition) the text on the sign 108, even when the user 100 did not. As the detector 104 may thus process more information within the field of view 102 of the user 100 than the user 100, the detector 104 may be used to "augment" the field of view 102 of the user 100.

As another example, the field of view 102 of the user 100, as shown, does not include the house 110 or the person 112. The person 112 may be, for example, a friend of the user 100. As such, the user 100 may be interested in seeing the person 112, such that the person 112 is an "object of interest" for the user 100. However, because the person 112 is outside the field of view 102 of the user, the user 100 may be unaware of the presence of the person 112. As the field of view 106 of the detector 104 includes each of the sign 108, the house 110, and the person 112, the detector 104 may image the environment within its field of view 106, and the imaged environment may include the person 112. The detector 104 may thus be used to "augment" the field of view 102 of the user.

Figure 2:
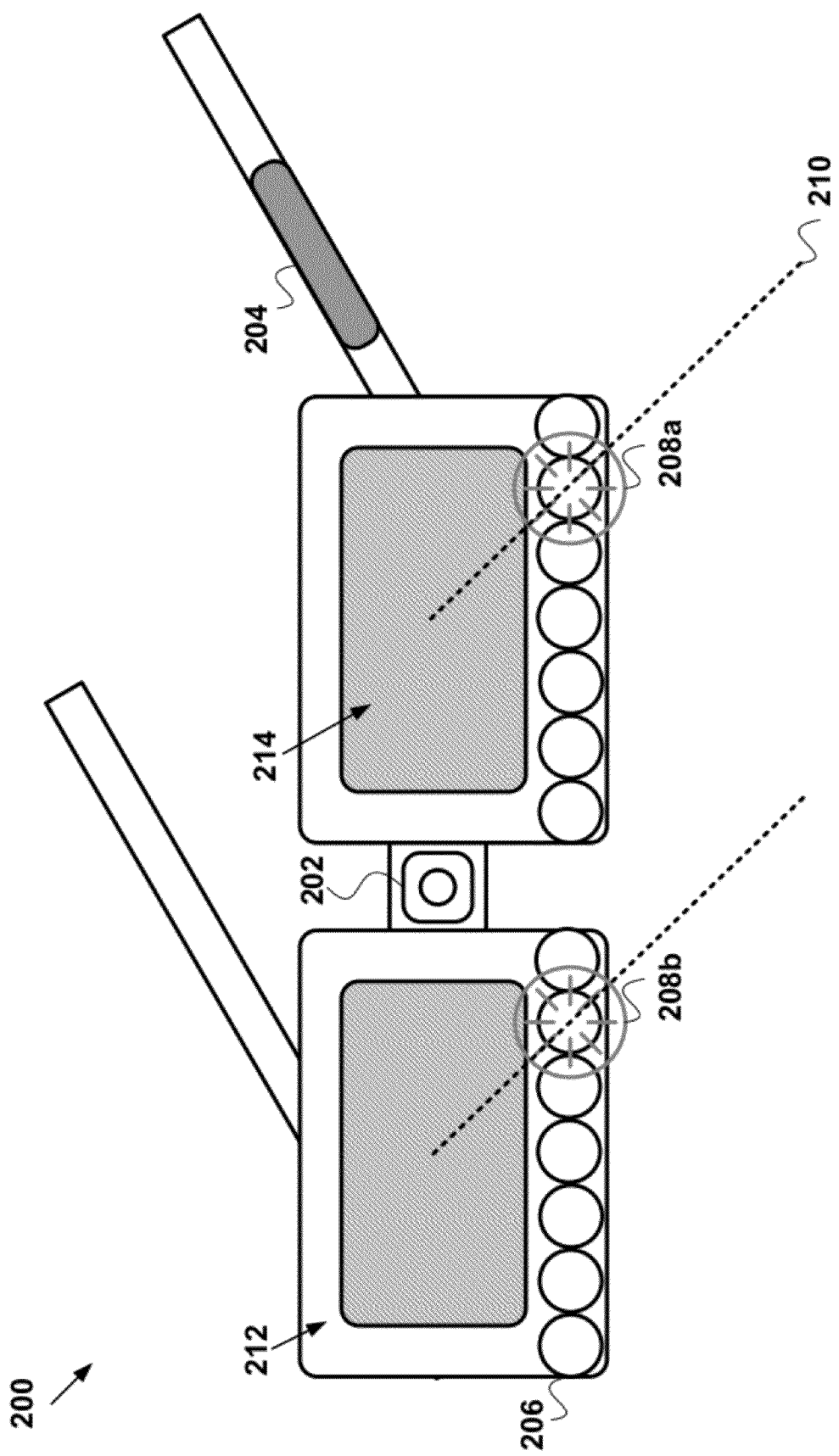
FIG. 2 shows an embodiment of an example device for augmenting a field of view of a user.

FIG. 2 shows an embodiment of an example system for augmenting a field of view of a user. The device 200 is shown as an eyewear device, in particular a pair of glasses, but the device 200 is not so limited. Other embodiments are possible as well. In some embodiments, the device 200 may be configured to be worn over one or both eyes of a user.

The device 200 is shown to include a frame 212 and lenses 214. Each of the frame 212 and the lenses 214 may take various shapes and dimensions and may be made of various materials.

As shown, the device 200 includes a detector 202. The detector 202 may be mounted on the frame 212, or on one of the lenses 214, or elsewhere on the device 200. The detector 202 may be, for example, a camera or other imaging device. The detector 202 may be a two-dimensional detector, or may have a three-dimensional spatial range. In some embodiments, the detector 202 may be enhanced through sensor fusion technology. In any case, the detector 202 is configured to image an environment, such as the environment surrounding a user. Alternately, the environment may be a digital display.

The imaged environment may include one or more objects of interest. In this case, an image of the environment generated by the detector 202 will include images (representations) of the one or more objects of interest. Some of the objects of interest imaged by the detector 202 may lie outside a field of view of a user of the device 200, or may lie within an unprocessed portion of the field of view of the user of the device 200, as described above. Accordingly, the detection of these objects of interest by the detector 202 serves to "augment" the field of view of the user.

In addition to the detector 202, the device 200 is shown also including a processor 204. The processor 204 may be or may include one or more general purpose processors and/or dedicated processors. Once the detector 200 has generated an image of an environment, the processor 204 may analyze the image of the environment. Such analysis may involve, for example, the processor 204 identifying objects of interest within the image of the environment. In an embodiment, this may involve the processor 204 comparing one or more objects in the image of the environment with a plurality of objects of interest for a user of the device 200, and, based on the comparison, selecting an object of interest from the plurality of objects of interest.

In one embodiment, the plurality of objects of interest may be stored in data storage on the device 200. Such data storage may include one or more magnetic, optical, organic, or other storage components, whether volatile or non-volatile, and may be incorporated in whole or in part with the processor 204. In another embodiment, the plurality of objects of interest may be stored in a database. Such a database may be tethered to the device 200, or may be remotely located. In any case, the database may be communicatively coupled to the device 200 by a wired or wireless link. In one embodiment, the device may include a wireless adaptor configured to wirelessly connect to one or more wireless networks. The wireless adaptor may also be configured to access the database.

The plurality of objects of interest may be manually assembled by a user, or may be automatically assembled by the device 200 or a server affiliated with the device 200. Such automatic assembly of the objects of interest may be based on indicated interests, preferences, social networks of the user, or other criteria. In one embodiment, the plurality of objects may be assembled through a combination of manual and automatic assembly.

By comparing the objects in the image of the environment with a plurality of objects of interest for a user of the device 200, the processor 204 may determine if any of the objects in the environment are objects of interest for the user. In the event the processor 204 identifies within the environment an object of interest for the user, the device 200 will work to draw the user's attention to the identified object of interest. In particular, the device 200 will work to indicate to the user a spatial location of the identified object of interest relative to the user.

To this end, the processor 204 may be configured to determine the relative spatial location of the identified object of interest. In some embodiments, the processor 204 may be configured to determine the relative spatial location of the identified object of interest using one or more of stereoscopic disparity, occlusion, optical flow, or light-based ranging to calculate the position and/or trajectory of the object of interest. Alternately or additionally, the processor 204 may be configured to run a simple image recognition algorithm that detects the presence of the object of interest and notes if it leaves the computed visual field of the user. In other embodiments, an object of interest may include a global positioning system (GPS), optical marker, or radio frequency identification (RFID) that is detectable by the device 200. Once the device 200 detects the location of the object of interest, the device 200 may calculate the relative spatial location of the object of interest. In still other embodiments, the device 200 may use one or more orientation sensors (e.g., an accelerometer or a gyrometer) and/or optical tracking equipment (e.g., a sensor array included in or remote from the device 200) to determine movement of the device 200 relative to the environment. Based on the movement of the device 200, the device 200 may determine a field of view of the detector 202. The device 200 may then determine a position of the object of interest within the field of view of the detector 202. Other examples are possible as well.

In general, the processor 204 may analyze the image of the environment in order to determine the location of the identified object of interest within the image of the environment. If the identified object of interest is located, for example, on the far left-hand side of the image of the environment, the processor 204 may determine that the identified object of interest has a relative spatial location to the far left of the user. As another example, if the identified object of interest is located in the center of the image of the environment, the processor 204 may determine that the identified object of interest has a relative spatial location directly in front of the user. Other examples are possible as well.

Once the relative spatial location of an identified object of interest is determined by the processor 204, the device 200 will work to draw the user's attention to the identified object of interest. This may be done through an array of visual indicators 206 included in the device 200, as shown in FIG. 2. The array of visual indicators 206 may be mounted along at least a portion of an outer perimeter of the frame 212. Alternately or additionally, the array of visual indicators 206 may be mounted on the frame around an outer edge of each lens of the device 200. While the array of visual indicators 206 is shown to be a horizontal array, the array 206 is not so limited. For example, in one embodiment, the array of visual indicators 206 may include one or more horizontal arrays, vertical arrays, and two-dimensional arrays. Other configurations are possible as well. In one embodiment, the visual indicators may be light emitting diodes (LEDs). Other visual indicators are possible as well.

As noted above, the array of visual indicators 206 may be used to draw the user's attention to the identified object of interest. In particular, one or more visual indicators in the array of visual indicators 206 may be used to indicate the relative spatial location of the identified object of interest, as determined by the processor 204. In particular, the processor 204 may be configured to select from the array of visual indicators 206 at least one visual indicator that has a relative spatial location of the array that is indicative of the determined relative spatial location of the identified object of interest.

As an example, the determined relative spatial location of the identified object may be determined to be to the far left of the user, as in the example above. In this case, the processor 204 may select from the array of visual indicators 206 a set of one or more visual indicators that is on the far left side of the array of visual indicators 206 (from the perspective of the user). The selected visual indicator(s) may then be used to draw the user's attention to the identified object of interest. In one embodiment, this may involve illuminating the selected visual indicator(s), changing the color of the visual indicator(s), pulsing the visual indicator(s), or some combination thereof. Other examples are possible as well.

In one embodiment, the array 206 may be considered to be a single array spanning the entire bottom of the device 200. In this embodiment, in order to draw the attention of the user to the object of interest located to the far left of the user, visual indicator(s) 208a, located on the far left side of the array 206 (from the perspective of the user) may be illuminated, as shown.

In another embodiment, the array 206 may be considered to be two arrays, one for each lens of the device 200. In this embodiment, visual indicators 208a and 208b, each located on the far left side of its respective array (from the perspective of the user) may be illuminated, as shown, in order to draw the attention of the user to the object of interest located to the far left of the user. Other examples are possible as well.

Upon illumination (or other indication) of the selected visual indicators, the user's attention will be drawn to the relative spatial location of the object of interest, as shown by sight lines 210. In this manner, the device 200 may augment the field of view of the user.

In one embodiment, the device 200 may also include a power supply, such as a battery pack. In one embodiment, the device 200 may be tethered to a power supply through a wired or wireless connection. Other examples are possible as well.

As noted above, a device for augmenting a field of view of a user may make use of a database that stores a plurality of objects of interest for the user. In the event the database is not included in the device, a system including the device and the database may be considered.

Figure 3:
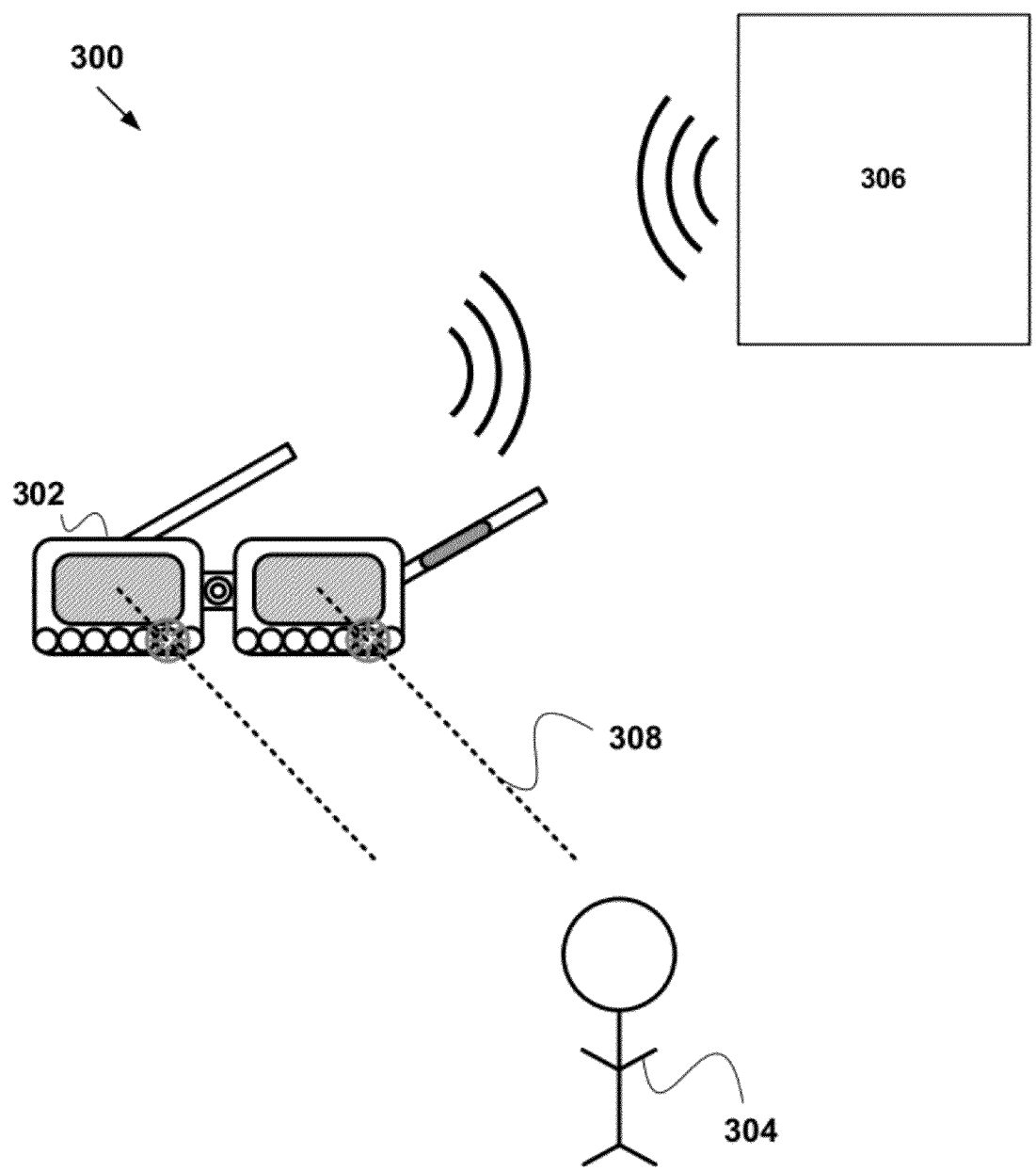
FIG. 3 shows an embodiment of an example system for augmenting a field of view of a user.

FIG. 3 shows an embodiment of an example system for augmenting a field of view of a user. As shown, the system 300 includes a device 302, an object of interest 304 (shown as a person), and a database 306. In some embodiments, the object of interest 304 may be outside the field of view of a user of the device 302, but may be inside the field of view of a detector included in the device 302. The database 306 stores a plurality of objects of interest for the user. The database 306 may be communicatively coupled to the device 302, for example, via a wireless connection.

Upon imaging an environment including the object of interest 304, the device 302 may analyze the imaged environment, as described above, in order to determine if the environment includes any objects of interest for the user. To this end, the device 302 may access the database 306, and may use the plurality of objects of interest stored in the database 306. In particular, the device 302 may compare images of objects in the imaged environment with the plurality of objects of interest stored in the database 306. Alternately, the database 306 may be configured to perform such a comparison, such that the device 302 may send to the database 306 the image of the environment, and the database 306 may perform the comparison.

In either case, such a comparison will indicate to the device 302 that the object of interest 304 is an object of interest for the user. Accordingly, the device 302 will identify a relative spatial location of the object of interest 304, and will then use the array of visual indicators to indicate the relative spatial location of the object of interest 304, thereby drawing the attention of the user to the object of interest 304, as indicated by the sight lines 308.

2. Overview of a Method

Figure 4:
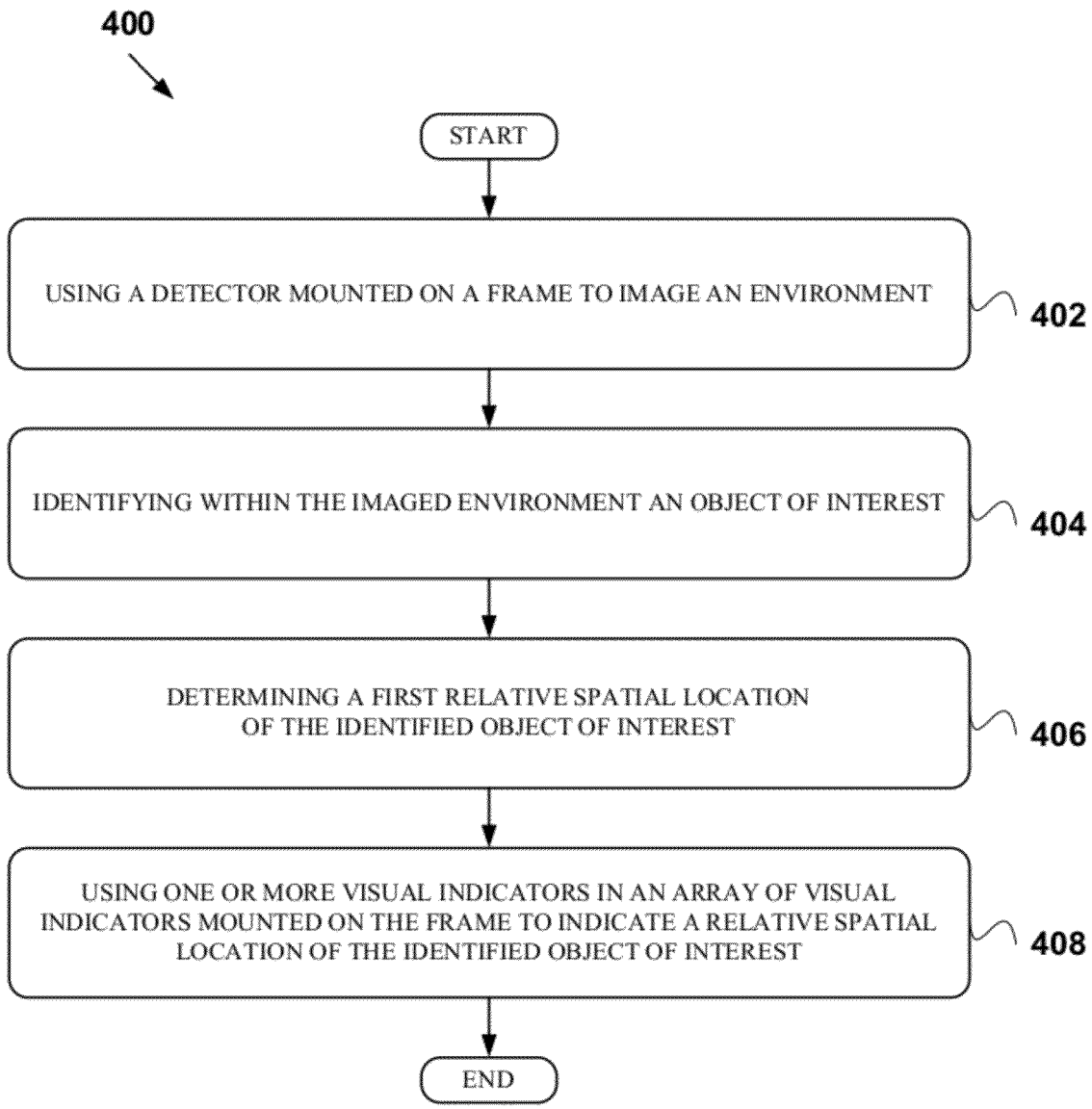
FIG. 4 shows a flow chart according to one example embodiment of a method for augmenting a field of view of a user.

FIG. 4 shows a flow chart according to one example embodiment of a method for augmenting a field of view of a user. The method 400 begins at block 402, where a detector mounted on a frame is used to image an environment. As described above, in one embodiment, the detector may have a field of view that is larger than a field of view of the user.

The method continues at block 404, where an object of interest is identified within the imaged environment. In one embodiment, this may involve a processor analyzing an image of the environment generated by the detector and comparing objects from the image of the environment with images of a plurality of objects of interest of the user, as described above. Additionally, this may involve the processor determining a relative spatial location of the object of interest.

The method continues at block 406, where a relative spatial location of the identified object of interest (relative to the detector) is determined, using any of the methods described above.

The method continues at block 408, where one or more visual indicators in an array of visual indicators mounted on the frame are used to indicate a relative spatial location of the identified object of interest. If, as noted above, a relative spatial location of the identified object of interest has been determined, block 406 may involve selecting a set of one or more visual indicators in the array that have a relative spatial location in the array that is indicative of the relative spatial location of the identified object of interest. For example, if the relative spatial location of the identified object of interest is to the far left of the user, the relative spatial location in the array of the set of one or more visual indicators may be on the far left side of the array, from the perspective of the user.

Block 408 may additionally involve illuminating, changing the color of, or pulsing the selected visual indicator(s). If the color of the selected visual indicator(s) is changed, the color may be selected according to a classification or an attribute of the identified object of interest. In some embodiments, the objects of interest may be automatically classified based on known qualities of the object of interest. As an example, the selected visual indicator(s) may turn blue if the object of interest is a person, or may turn green is the object of interest is a monument. In other embodiments, the user may have previously manually classified objects of interest into, for example, Groups A and B. In this example, the selected visual indicator(s) may turn red if the object of interest has been classified in Group A, and may turn yellow if the object of interest has been classified in Group B. Other examples are possible as well.

In another embodiment, the color of the selected visual indicator(s) may be selected according to a level of urgency of the object of interest. For example, the selected visual indicator(s) may turn red if a level of urgency of the object of interest is high, and may turn blue if a level of urgency of the object of interest is low. Other examples are possible as well.

In an embodiment where the plurality of objects of interest is assembled through a combination of manual and automatic assembly, as described above, the color of the selected visual indicator(s) may be selected according to whether the object of interest was a manually-selected or automatically-selected object of interest. Other examples are possible as well.

At the completion of block 408, the user's attention may be drawn to the identified object of interest through use of the selected visual indicator(s). The method may end at block 406, or the method may repeat. Such repetition may triggered by a predetermined time delay, by movement of the user, by movement of the object of interest, or by another trigger.

3. Example Embodiments of a Device

Figure 5:
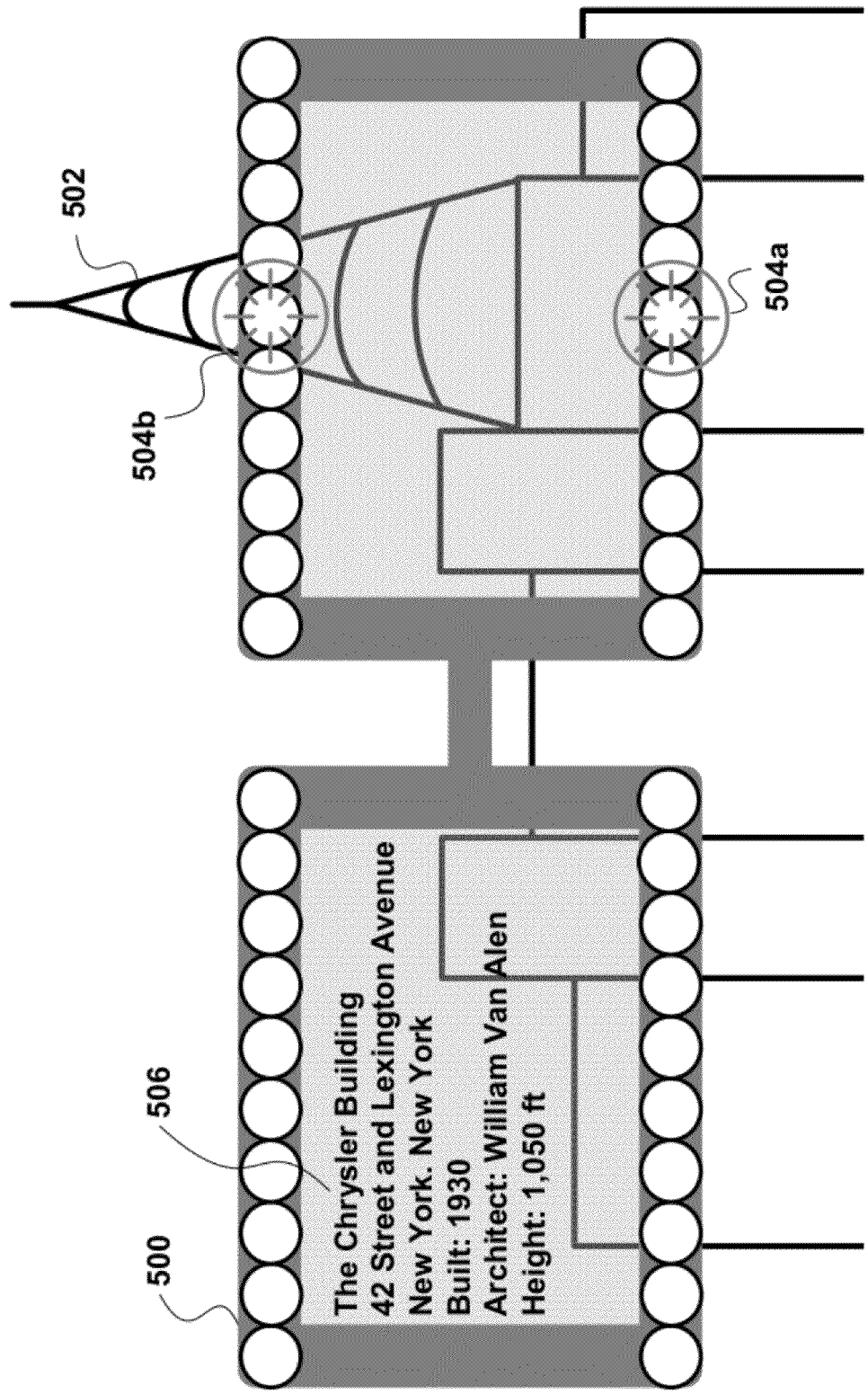
FIG. 5 shows an example use of the device according to one embodiment.

FIG. 5 shows an example use of the device according to one embodiment. In the example, an environment is being imaged by a device 500. As shown, the environment is a city skyline. Within the environment, the device 500 may identify one or more objects of interest. As shown, the device 500 has identified a building 502 as an object of interest. The building 502 may be selected from a plurality of objects of interest for a user of the device 500 that has been manually and/or automatically assembled, as described above. In one embodiment, the building 502 may be an object of interest that was automatically added to the plurality of objects of interest based on other objects of interest in the plurality. For example, if the user manually selected several other buildings as objects of interest, the device 500 may have automatically added building 502 to the plurality of objects of interest for the user. Other examples are possible as well.

Upon identifying the building 502, the device 500 may determine a relative spatial location of the building 502. As shown, the building 502 is to the center-right of the user. The device 500 may thus use the relative spatial location of the building 502 to select a set of visual indicators for use in indicating to the user the relative spatial location of the building 502.

In the example shown, the device 500 comprises two horizontal arrays of visual indicators, one above and one below the lenses. Within each array, the device 500 may illuminate a visual indicator that indicates the relative spatial location of the building 502. For example, visual indicators 504a and 504b may be illuminated, as shown. Each of visual indicators 504a and 504b is located in a center-right portion of its respective array, thereby indicating to a user of the device 500 the relative spatial location of the building 502 to the center-right of the user.

By illuminating each of visual indicators 504a and 504b, the device 500 may draw the user's attention to the building 502. Additionally, in the example where the building 502 was automatically added to the plurality of objects of interest, the visual indicators 504a and 504b may be illuminated in a color that indicates this to the user.

In one embodiment, the device 500 may provide the user with additional information about the building 502. As shown, additional information 506 about the building 502 is displayed on an electronic display, such as a pass-through display, of a lens of the device 500. In one embodiment, the pass-through display allows the user to read the additional information 506 without impairing the user's vision through the lens.

In one embodiment, the additional information 506 may be permanent information stored in a database or in data storage on the device 500. In another embodiment, the additional information 506 may be periodically updated either manually by the user or automatically by the device 500. As an example, if the object of interest is a person, the additional information 506 may include an unread text message or email from the person. As another example, if the object of interest is a clothing item, the additional information 506 may include the location of a store selling the clothing item, its price, or other information. Other examples are possible as well.

Figure 6:
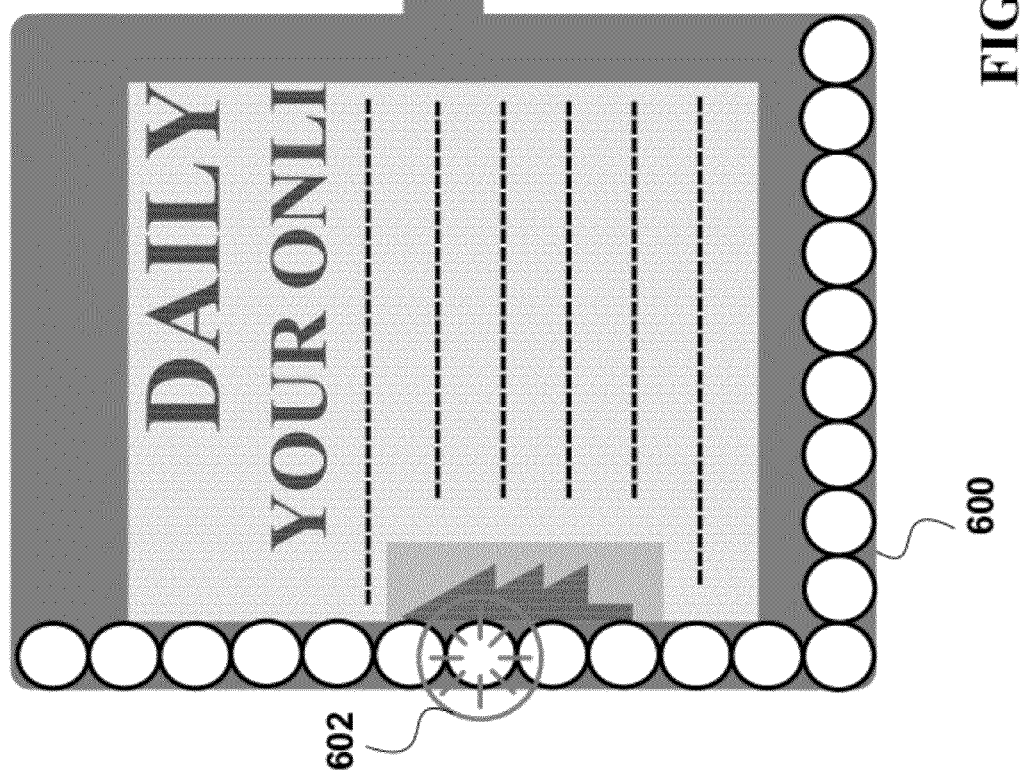
FIG. 6 shows an example use of the device according to one embodiment.

While FIG. 5 shows an example use of the device 500 in which the environment is a real environment, the device contemplated herein is not so limited. FIG. 6 shows an example use of the device according to one embodiment. In the example, an environment is being imaged by a device 600. As shown, the environment is a digital display. The digital display may be larger than a field of view of a user of the device 600. The digital display may be provided by the device 600, or may be provided by another entity communicatively coupled to the device 600. In either case, the device 600 may be aware of the entire digital display, but only a portion of the digital display may be within the field of view of the user. Further, only some of the portion of the digital display that is within the field of view of the user may be processed by the user's brain. Accordingly, the device 600 may be aware of objects on the digital display that are not visible by or are not processed by the user. As described above, the device 600 may analyze these objects in order to determine if they are objects of interest for the user.

In the event an object of interest is identified by the device 600, the device 600 may illuminate, change the color of, or pulse one or more visual indicators, such as visual indicator 602, so as to draw the attention of the user to the object of interest, as described above. In some instances, once the user's attention is drawn to the object of interest, the user may center his or her field of vision on the object of interest such that the object of interest may fall within the portion of the field of view of the user that is processed by the user's brain. Alternately, the visual indicator 602 may indicate a direction in which the user must look in order to bring the object of interest into the user's field of view. Other examples are possible as well.

In each of the above-described embodiments, once an object of interest is indicated by the visual array, a user will likely look toward the object of interest. In some cases, the user may additionally turn his or her head towards the object, such that the relative spatial location of the object (from the perspective of the user) changes. To account for such movement of the user, a device may include a gyrometer, accelerometer, or other orientation sensor that is configured to detect movement of the device. In these embodiments, when the user turns his or her head, the orientation sensor will sense the direction in which the user has turned his or her head. Accordingly, visual indicators used to indicate the position of the object of interest may be reselected in order to account for the movement of the user.

In some cases, the object of interest may be an object that is capable of movement, such as a person or a vehicle. Accordingly, in some cases the object of interest may move, such that the relative spatial location of the object (from the perspective of the user) changes. To account for such movement of the object of interest, the method described above may be performed iteratively, such that the visual indicators are repeatedly reselected to account for the movement of the object of interest.

FIGS. 7A-7D illustrate iterative indications of an object of interest during movement of one or both of a user and an object of interest. In FIG. 7A, an object of interest is at a first relative spatial location 702a. The device may determine that the first relative spatial location 702a is to the left of the user. Based on this determination, the device may select a first visual indicator 704a in an array of visual indicators 704 to indicate the first relative spatial location 702a of the object of interest. As shown, the device may select the first visual indicator 704a to have a relative spatial location in the array 704 that indicates to the user the first relative spatial location 702a of the object of interest.

FIGS. 7A-7D illustrate iterative indications of an object of interest during movement of one or both of a user and an object of interest. In FIG. 7A, an object of interest is at a first relative spatial location 702a. The device may determine that the first relative spatial location 702a is to the left of the user. Based on this determination, the device may select a first visual indicator 704a in an array of visual indicators 704 to indicate the first relative spatial location 702a of the object of interest. As shown, the device may select the first visual indicator 704a to have a relative spatial location in the array 704 that indicates to the user the first relative spatial location 702a of the object of interest.

Illumination (or color change) of the first visual indicator 704a may draw the attention of the user towards the object of interest, such that the user turns his or her head towards the object of interest, thus changing the relative spatial location of the object of interest. Alternately or additionally, the object of interest may move, thus changing the relative spatial location of the object of interest.

In any case, the relative spatial location of the object of interest may shift to a second relative spatial location 702b, as shown in FIG. 7B. Triggered either by a detection of the orientation sensor that the user has moved, or by the completion a predetermined time delay, the device may once again determine a relative spatial location of the object of interest. In this iteration, the device may select a second visual indicator 704b in the array 704 to indicate the second relative spatial location 702b of the object of interest.

In the event the trigger is a detection of the orientation sensor that the user has moved, the device may use the orientation sensor to determine a direction in which the field of view of the user has shifted. For example, if the orientation sensor detects that the user has turned his or her head to the left, the device may determine that the field of view of the user has also shifted to the left. Based on this determination, the device may select the second visual indicator 704b to be shifted along the array 704 from the first visual indicator 704a in a direction opposite the direction in which the field of view has shifted. In the example, the second visual indicator 704b may be shifted to the right along the array 704 from the first visual indicator 704a, as shown. Additionally, the orientation sensor may be configured to detect an extent to which the device has moved, and based on this detection the device may determine an amount by which the second visual indicator 704b will be shifted from the first visual indicator 704a. That is, the orientation sensor may determine both a direction and extent of the movement of the user, and the device may use this determination to select both a direction and an amount by which to shift the set of visual indicators.

As shown in FIG. 7C, one or both of the user and the object of interest may move once again, and the method may repeat. In this iteration, the device may detect a third relative spatial location 702c of the object of interest, and may accordingly select a third visual indicator 704c in the array 704 to indicate the third relative spatial location 702c of the object of interest to the user.

In some cases, the object of interest may move outside the field of view of the user. Additionally, in some cases, the user may turn his or her head in the incorrect direction, such that the object of interest moves outside the field of view of the user. In these cases, the device may detect the relative spatial location of the object of interest, and may select a set of visual indicators on the periphery of the array in order to indicate that the object of interest is outside the user's field of view in the indicated direction. As shown, the object of interest is outside the user's field of view to the right, and the rightmost visual indicator 704d is illuminated.

In each of the above examples, the selected visual indicator (e.g., 704a, 704b, 704c, and 704d) may be a single visual indicator, or may be a set of one or more visual indicators.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A head-mountable device, comprising:
a frame comprising an external side and an internal side, wherein the internal side substantially faces a front of at least one eye when the head-mountable device is worn;
an array of visual indicators mounted along at least a portion of the internal side of the frame, wherein the array of visual indicators is arranged on the frame such that when the head-mountable device is worn, the visual indicators emit light towards the at least one eye; and
a computing system configured to:
receive image data of a first field of view of an environment, wherein the first field of view corresponds to a field of view of an image-capture device mounted on the head-mountable device;
detect an object within the image data of the first field of view of the environment, wherein the object is outside of a second field of view, wherein the second field of view corresponds to a field of view of a wearer of the head-mountable device when the head-mountable device is worn;
determine a relative spatial location of the object with respect to the second field of view; and
cause the array of visual indicators to indicate the relative spatial location of the object.

2. The head-mountable device of claim 1, wherein causing the array of visual indicators to indicate the relative spatial location of the object comprises at least one of illuminating at least one visual indicator in the array of visual indicators and changing the color of at least one visual indicator in the array of visual indicators.

3. The head-mountable device of claim 2, wherein the at least one visual indicator in the array of visual indicators comprises at least one visual indicator in the array of visual indicators having a relative spatial location in the array that is indicative of the relative spatial location of the object.

4. The head-mountable device of claim 1, wherein the array of visual indicators comprises at least one of a horizontal linear array of light emitting diodes (LEDs), a vertical linear array of LEDs, and a two-dimensional array of LEDs.

5. The head-mountable device of claim 1, wherein the device is configured to be worn over at least one eye of the wearer.

6. The head-mountable device of claim 1, wherein the relative spatial location of the object is relative to the wearer.

7. The head-mountable device of claim 1, wherein the head-mountable device is configured to receive an indication of the object and an indication of the relative spatial location of the object.

8. The head-mountable device of claim 1, wherein the first field of view is larger than the second field of view.

9. The head-mountable device of claim 1, further comprising an image-capture device configured to:
capture the image data of the first field of view of the environment; and
transmit the image data to the computing system.

10. The head-mountable device of claim 9, wherein the relative spatial location of the object is relative to the image-capture device.

11. The head-mountable device of claim 1, further comprising an orientation sensor configured to detect movement of the device.

12. The head-mountable device of claim 11, wherein the array of visual indicators is configured to indicate an adjusted relative spatial location of the object based on movement of the device detected by the orientation sensor.

13. A method, comprising:
receiving image data of a first field of view of an environment, wherein the first field of view corresponds to a field of view of an image-capture device mounted on a head-mountable device, wherein the head mountable device comprises a frame;
detecting an object within the image data of the first field of view of the environment, wherein the object is outside of a second field of view, wherein the second field of view corresponds to a field of view of a wearer of the head-mountable device when the head-mountable device is worn;
determining a relative spatial location of the object with respect to the second field of view; and
causing an array of visual indicators to indicate the relative spatial location of the object, wherein the array of visual indicators is mounted along at least a portion of an internal side of the frame, wherein the internal side substantially faces a front of at least one eye when the head-mountable device is worn, and wherein the array of visual indicators is arranged on the frame such that when the head-mountable device is worn, the visual indictors emit light towards the at least one eye.

14. The method of claim 13, wherein the relative spatial location of the object is relative to the wearer.

15. The method of claim 13, wherein causing the array of visual indicators to indicate the relative spatial location of the object comprises at least one of illuminating at least one visual indicator in the array of visual indicators and changing the color of at least one visual indicator in the array of visual indicators.

16. The method of claim 15, wherein the at least one visual indicator in the array of visual indicators comprises at least one visual indicator in the array of visual indicators having a relative spatial location in the array that is indicative of the relative spatial location of the object.

17. The method of claim 13, further comprising receiving an indication of the object and an indication of the relative spatial location of the object.

18. The method of claim 13, wherein the relative spatial location of the object comprises a first relative spatial location of the object, the method further comprising using the array of visual indicators to indicate a second relative spatial location of the object, wherein the object is outside the second field of view.

19. The method of claim 18, wherein using the array of visual indicators to indicate the second relative spatial location of the object comprises using the array of visual indicators to indicate the second relative spatial location of the object in response to detecting that the wearer has moved.

20. The method of claim 18, wherein using the array of visual indicators to indicate the second relative spatial location of the object comprises using the array of visual indicators to indicate the second relative spatial location of the object in response to detecting that the object has moved.

21. The method of claim 13, wherein detecting the object within the image data of the first field of view of the environment comprises:
identifying at least one object in the image data of the first field of view of the environment;
comparing the at least one object with a plurality of objects of interest stored in a database; and
based on the comparison, selecting the object from the plurality of objects of interest.

22. The method of claim 13, wherein causing the array of visual indicators to indicate the relative spatial location of the detected object comprises transmitting to the head-mountable device an indication of the detected object and the determined relative spatial location of the detected object.

* * * * *